United States Patent [19]

Matsumoto et al.

[11] Patent Number: 5,432,869
[45] Date of Patent: Jul. 11, 1995

[54] IMAGE SIGNAL PROCESSING METHOD AND APPARATUS

[75] Inventors: Yasuki Matsumoto, Hirakata; Haruo Yamashita, Osaka; Tsumoru Fukushima, Katano, all of Japan

[73] Assignee: Matsushita Electric Industrial Co., Ltd., Osaka, Japan

[21] Appl. No.: 982,301

[22] Filed: Nov. 25, 1992

[30] Foreign Application Priority Data

Nov. 29, 1991 [JP] Japan .................................. 3-316526

[51] Int. Cl.⁶ .............................................. G06K 9/40
[52] U.S. Cl. .................................... 382/274; 348/607; 358/518; 382/167
[58] Field of Search ....................... 382/52, 54, 56, 27, 382/42; 358/518, 520, 532; 348/607, 630, 687

[56] References Cited

U.S. PATENT DOCUMENTS

| | | | |
|---|---|---|---|
| 4,468,704 | 8/1984 | Stoffel et al. | 382/52 |
| 4,590,609 | 5/1986 | Chevalet et al. | 382/52 |
| 4,630,307 | 12/1986 | Cok | 382/27 |
| 4,845,547 | 7/1989 | Naimpally | 358/31 |
| 5,235,434 | 8/1993 | Wober | 382/52 |

FOREIGN PATENT DOCUMENTS

| | | |
|---|---|---|
| 61-173585 | 8/1986 | Japan . |
| 32-07192 | 9/1991 | Japan . |
| 3-207192 | 9/1991 | Japan . |

*Primary Examiner*—Joseph Mancuso
*Attorney, Agent, or Firm*—Ratner & Prestia

[57] ABSTRACT

An improved image signal processing method and apparatus which can reduce the color noises of high level with a simple construction without deterioration of the apparent resolution of the color signal, and wherein the color noise components in the horizontal direction is diffused in the vertical direction, in a region where the change in the brilliance distribution is less, by the detection of the correlation in the vertical direction of the brilliance. The smoothing processing with respect to the color signal is prohibited with respect to the abrupt edge portion so as to preserve the edge portion of the color, with an superior effect that the S/N improvement of the high level can be effected without deterioration of the color resolution in the vertical direction of the image.

5 Claims, 8 Drawing Sheets

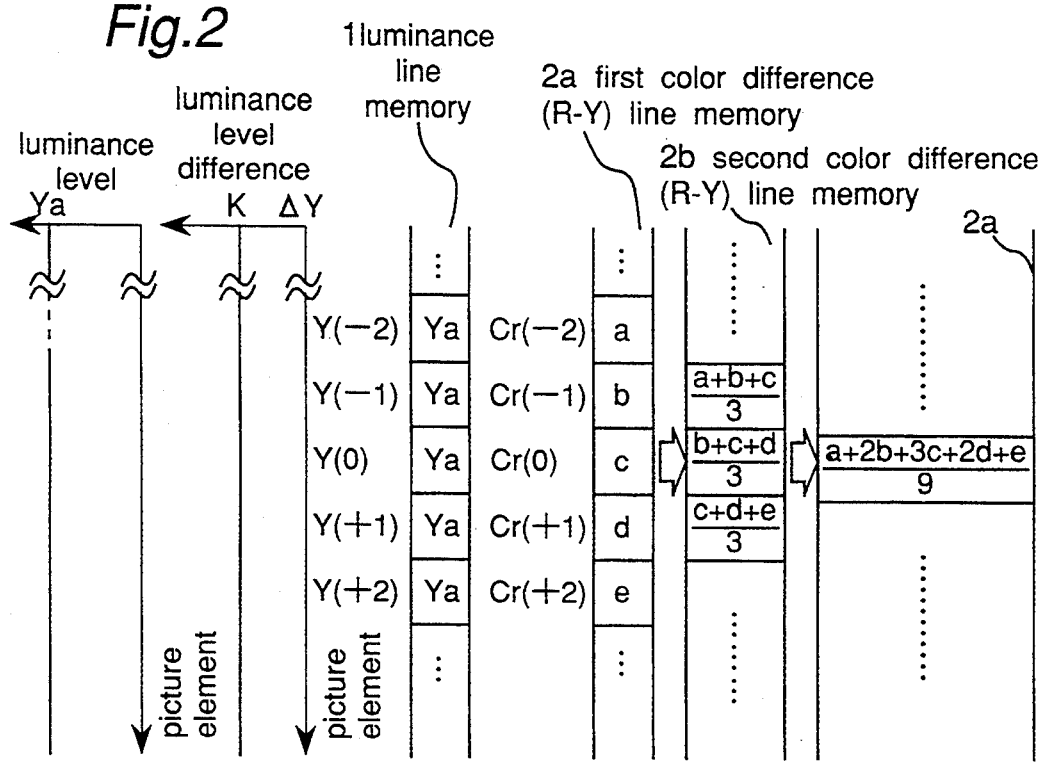
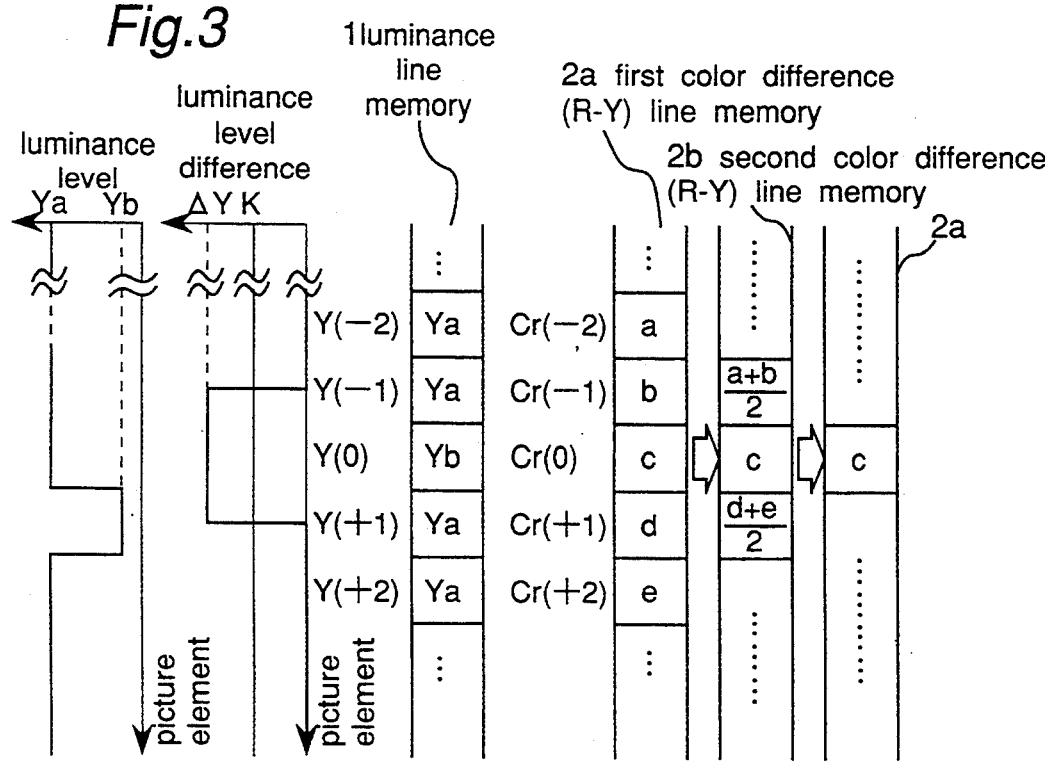

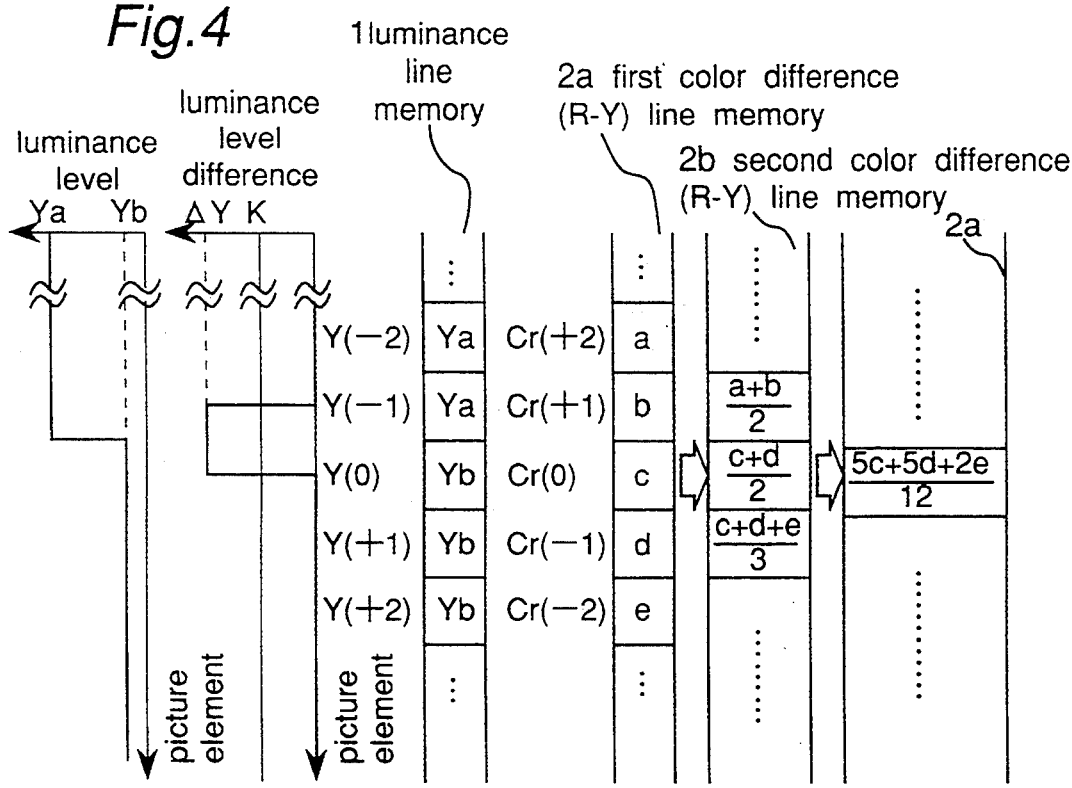
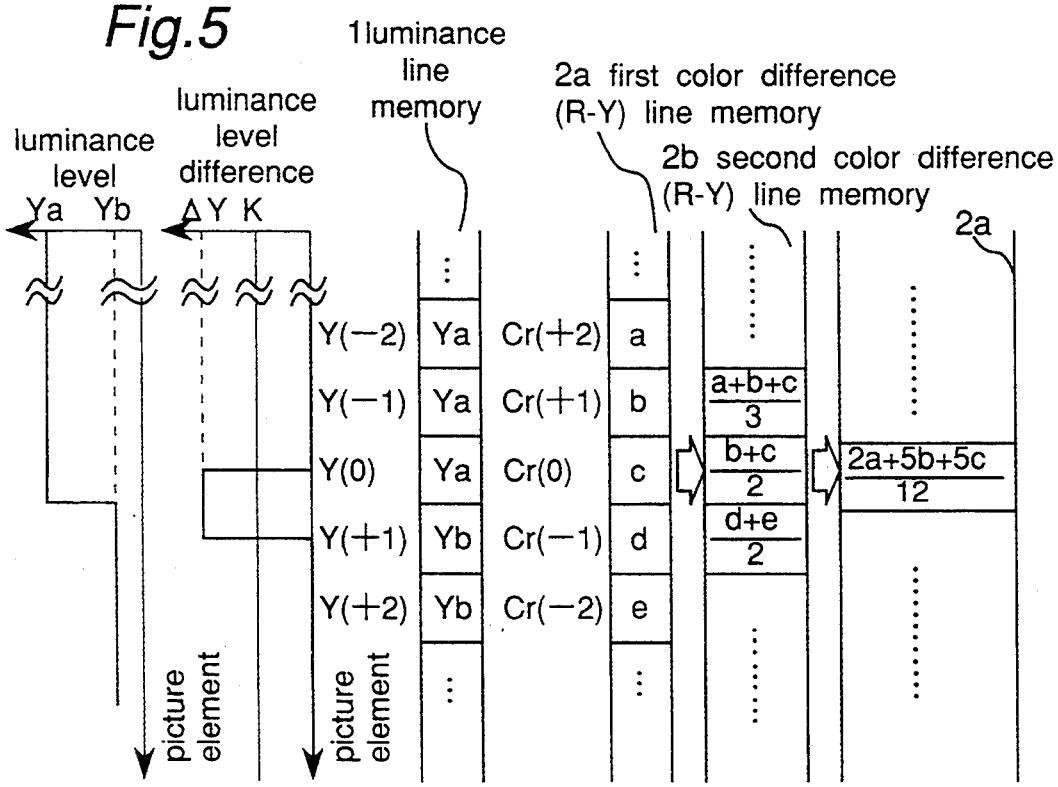

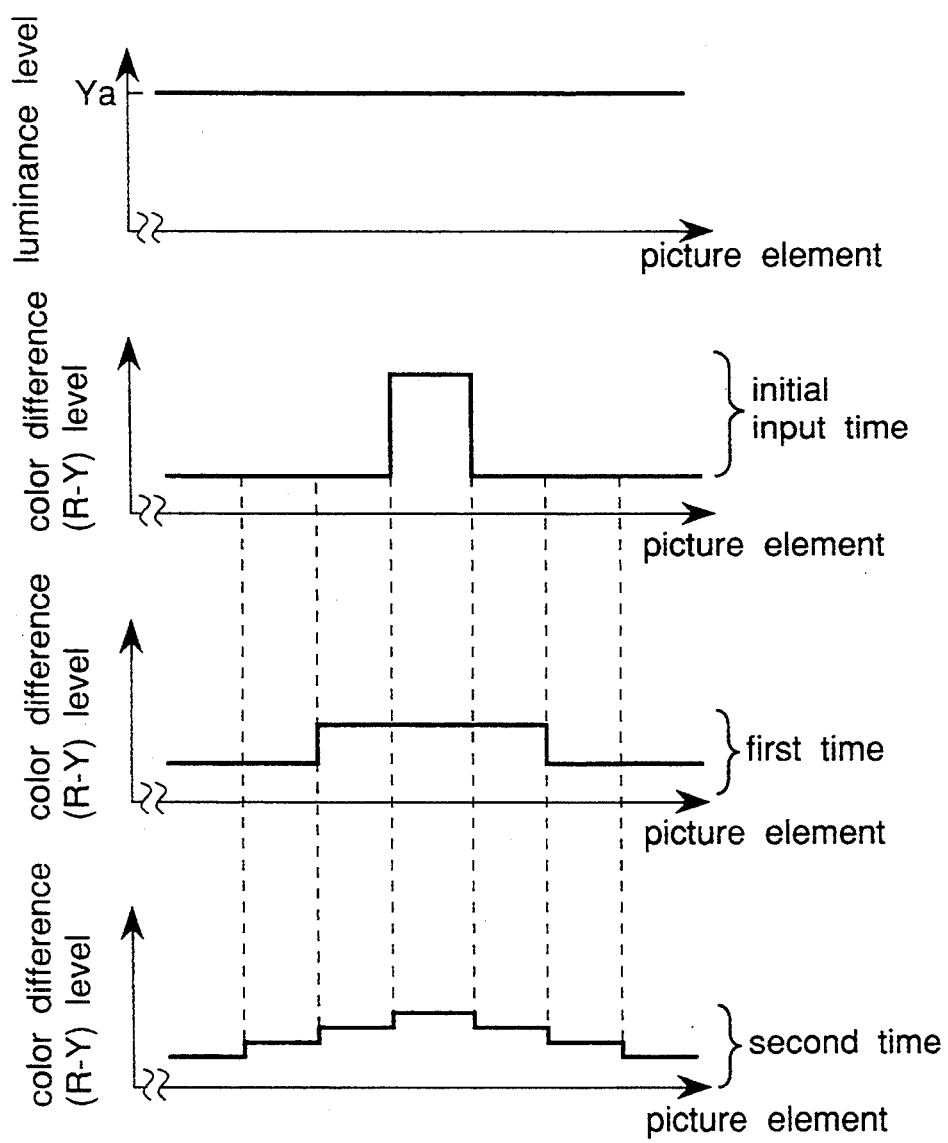

IMAGE SIGNAL PROCESSING METHOD AND APPARATUS

BACKGROUND OF THE INVENTION

The present invention generally relates to an image signal processing method and an apparatus of reducing color noises especially of a NTSC (National Television System Committee) video or the like in a video, a movie camera, a video printer and so on handing color images.

In recent years, highly faithful images can be reproduced with the use of printing image technology such as sublimation type heat transfer system or the like as the development of a hard copy technique, especially the hard copy technique of a full color. In the color reproduction, the reproducing capability equal to the silver salt photograph is provided by the recording material and the image processing. Even in the point of the resolution, it is approaching to the silver salt photograph with the use of the highly detailed image signals.

In the video printer for recording the television signals of the existing system, sufficient resolution cannot be obtained with respect to the resolution of the printer, because the resolution is restricted from the zone limit of the image signals of the NTSC or the like. Especially, in the color signal (color difference signal), the present situation is that the images blotted much in color are recorded, because the horizontal resolution is as extremely low as several tens in the resolution.

FIG. 9 shows a principle of removing the image noises in the first conventional embodiment. In FIG. 9, the brilliance signals 901 are inputted into a high pass filter (HPF) 90 and a low pass filter (LPF) 91 and are respectively separated into high frequency component 902 and the low frequency component 903 so as to reduce the noises with respect to the brilliance signal 901 separated from the image signal. The high frequency component separated by the HPF90 is non-linearly processed by a non-linear processing circuit 92 so as to remove the noise components within a constant amplitude range for obtaining a signal as shown in reference numeral 904. The signal is smoothed by an integration circuit 93, is corrected so that it may become the same in amplitude as before the input by the gain correcting circuit 94, and becomes a signal shown in reference numeral 905. The low frequency component separated by the LPF71 is added with an adder 95 to the high-pass brilliance signal with the noises of the high frequency component being removed as described hereinabove, the brilliance signal 906 with only the noises thereof being removed is outputted (Television Technique, Extra Edition 39 to 40p, September 1986).

An image appliance (Japanese Patent Publication 3-207192) with the color noises being reduced is provided as the second conventional embodiment. FIG. 10 shows a digital data processing means for removing the color noises by the image appliance in the second conventional embodiment. In FIG. 10, reference characters D-8 through D8 are continuous image data (color difference data) in the vertical direction with respect to the scanning lines of television and so on, reference numerals 1001 through 1017 are conversion table RAM so as to effect a computing operation shown in an (arithmetic equation 1) with respect to the input color difference data D-8 through D8.

$$D'_0 = \sum_{i=-8}^{8} a_i \cdot D_i \quad \text{(Arithmetic Equation 1)}$$

wherein a computing value, with respect to each color difference data, of 8 bits is accommodated in the conversion table RAM 1001 through 1017 (for example, the values of a-8*255 through a-8*0 are accommodated in the conversion table RAM801), ai is defined by an (arithmetical equation 2).

$$a_i = \frac{1}{4} \cdot \frac{\sin(\pi/4 \cdot i)}{(\pi/4 \cdot i)} \cdot \{0.5 \cdot (1 - \cos(\pi/8 \cdot (i + 8)))\} \quad \text{(Arithmetic Equation 2)}$$

where $-8 \leq i \leq 8$)

The (arithmetical equation 2) uses a filter of the characteristics of becoming a cut-off frequency $\pi/4$ when the sampling frequency has been made $2\pi$.

Therefore, the output color difference data D0' becomes the low pass filter applied in the vertical direction of the image, with the color noises in the vertical direction of the image being reduced.

When the image noise removing operation in the above described first is adapted to the color signal, the frequency of the noise becomes a low frequency component, because the frequency zone of the color signal is narrower with respect to the frequency zone of the brilliance signal. The low-pass filter which is extremely low in the cut off frequency has to be used, with a problem that the resolution of the color is considerably deteriorated by the low-pass filter. The image signal recorded on the VTR is considerably large, as compared with the brilliance, in the noise increase of the color signal.

In the image appliance in the above described second conventional embodiment, the smoothing filtering in the vertical direction is applied with respect to the color signal so as to reduce the color noises in the image vertical direction and has a large effect with respect to the high frequency noises of the color in a portion where an even color tone continues. The color signal changes are often sudden with respect to the edge portion (for example, contours) sudden in the brilliance change in the vertical direction of the image. In the image appliance of the second conventional embodiment, as the even smoothing filtering is applied in the vertical direction as described hereinabove in the image appliance of the second conventional embodiment, the smoothing operation is effected even with respect to the edge portion where the change in the color signal is larger. Therefore, color blots are caused in the vertical direction of the contours of the image, with a problem that the resolution of the color signal is deteriorated. The picture elements to be referred to in the filtering are increased (refer to 17 picture elements in the second conventional embodiment) so as to improve the effect of the filtering, and further bad influences are given to the color blots in the vertical direction of the contours of the image, with a problem that increased circuit scale is provided.

SUMMARY OF THE INVENTION

Accordingly, the present invention has been developed with a view to substantially eliminating the above discussed drawbacks inherent in the prior art, and has for its essential object to provide an improved image signal processing method and apparatus.

Another important object of the present invention is to provide an improved image signal processing method and apparatus which can reduce the color noises of high level with a simple construction without deterioration of the apparent resolution of the color signal.

In accomplishing these and other objects, according to one preferred embodiment of the present invention, which includes a brilliance line memory for storing the brilliance data of the picture element in the vertical direction of the image, a first coloring matter line memory and a second coloring matter memory for storing the coloring matter data of the picture element in the vertical direction of the above described image, an address setting means for setting the addresses of the above described brilliance line memory, the above described first coloring line memory, the above described second coloring matter line memory, a parallel outputting means for outputting the continuous three picture elements in parallel, an address switching means for switching the addresses of the above described first coloring matter line memory and the above described second coloring matter line memory, a data switching means for switching the data of the above described first coloring matter line memory and the above described second coloring matter line memory, a first computing means for computing the arithmetic mean of the coloring matter data of the above described three picture elements with the brilliance data of the picture element of the above described image and the central picture element of the continuous three picture elements of the color matter data being provided as a noticeable picture elements, a second computing means for computing the above described noticeable picture element and the arithmetical mean of the coloring matter data of the picture element adjacent to the above described upper portion, a third computing means for computing the above described noticeable picture element and the arithmetical mean of the coloring matter data of the adjacent picture element to the above described lower portion, a plurality of correlation value detecting means capable of correlation values of the brilliance data of the above described three picture elements, a setting means for outputting the reference setting values of the correlation property of the above described three picture elements, a plurality of comparing means for comparing the output of the above described plurality of correlation value detecting means with the output of the above described setting means so as to output the binary coded signal, a selecting means for selectively passing the output of the above described first computing means when the correlation is effected to all the brilliance data of the above described three picture elements, the output of the above described second computing means when the correlation is effected to the noticeable picture elements adjacent to the above described noticeable picture element and the picture element adjacent to the upper portion of the above described noticeable picture element among the above described three picture elements, the output of the above described three computing means when the correlation is effected to the above described noticeable picture element and the picture element adjacent to the lower portion of the above described noticeable picture element among the above described three picture elements, the coloring matter data of the above described noticeable picture element when no correlation is provided to the brilliance data of the above described three picture elements, a switching operation by the above described address switching means and the data switching means, and a selecting operation by the above described selecting means with respect to all the picture elements in the vertical direction of the above described picture images are alternately repeated by plurality.

In the present invention, the smoothing filter in the vertical direction with respect to the coloring matter data is provided without the deterioration in the brilliance of the image being caused by the arithmetical mean provided between the noticeable picture element and the upper, lower coloring matter data adjacent to the vertical direction under the above described construction. By the detection of the correlation in the brilliance of continuous three picture elements in the vertical direction, the coloring matter data are also considered a portion large in change with respect to the edge portion violent in the brilliance change in the vertical direction in accordance with the correlation of the brilliance so as to make the putting on condition of the smoothing filter lighter. The putting on operation of the smoothing filter is made stronger when the change in the brilliance is less.

The smoothing operation of the coloring matter data is expanded in the vertical direction by the simple construction, with the computation of effecting the above described arithmetical mean being repeated by plurality with respect to the noticeable picture element so as to obtain a higher effect in the color noise.

BRIEF DESCRIPTION OF THE DRAWINGS

These and other objects and features of the present invention will become apparent from the following description taken in conjunction with the preferred embodiment thereof with reference to the accompanying drawings, in which;

FIG. 2 is a view showing an operation when correlation property is provided with respect to the brilliance data Y (−1), Y (0), Y (+1) of three picture elements of the image signal processing apparatus in one embodiment of the present invention;

FIG. 3 is a view showing an operation when no correlation property is not provided with respect to the brilliance data of three picture elements of the image signal processing apparatus in one embodiment of the present invention;

FIG. 4 is a view showing an operation when correlation property is provided with respect to the brilliance data Y (0) of the noticeable picture element of the image signal processing apparatus in one embodiment of the present invention, and the brilliance data Y (+1) of the picture element in the adjacent lower portion of the noticeable picture element;

FIG. 5 is a view showing an operation when the correlation property is provided with respect to the brilliance data Y (0) of the noticeable picture element of the image signal processing apparatus in one embodiment of the present invention, and the brilliance data Y (−1) of the picture element in the adjacent upper portion of the noticeable picture element;

FIG. 6 is a chart showing the operation of the filtering when color noises are provided at a smooth brilliance distribution time in one embodiment of the present invention;

DETAILED DESCRIPTION OF THE INVENTION

Figure 1:
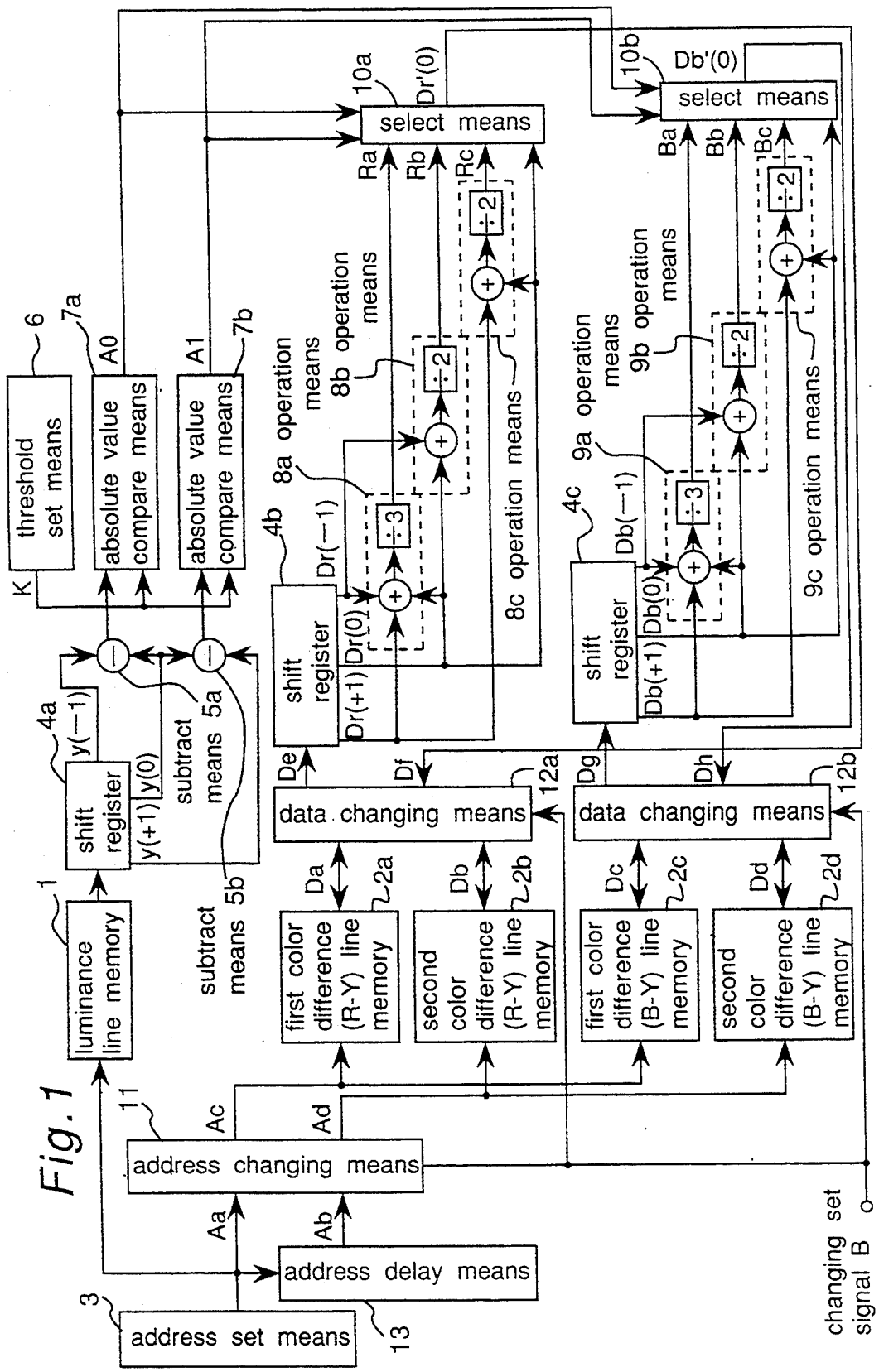
FIG. 1 is a block diagram of an image signal processing apparatus in one embodiment of the present invention.

Before the description of the present invention proceeds, it is to be noted that like parts are designated by like reference numerals throughout the accompanying drawings.

FIG. 1 is a block diagram showing the construction of an image signal processing apparatus in one embodiment of the present invention.

Referring now to FIG. 1, reference numeral 1 is a brilliance line memory for storing the brilliance data of picture element in the vertical direction of the image, reference numerals 2a, 2b are respectively a first color difference (R−Y) line memory and a second color difference (R−Y) line memory for storing the color difference (R−Y) data of the picture element in the vertical direction of the picture image, reference numerals 2c, 2d are respectively a first color difference (B−Y) line memory and a second color difference (B−Y) line memory for storing the color difference (B−Y) of the picture element in the vertical direction of the image, reference numeral 3 is an address setting means for setting the addresses of the brilliance line memory 1, the first color difference (R−Y) line memory 2a, the second color difference (R−Y) line memory 2b, the first color difference (B−Y) line memory 2c, and the second color difference (B−Y) line memory 2d, reference numeral 4a is a shift register for shifting the brilliance data to output in parallel the brilliance data Y (−1), Y (0), Y (+1) of three picture elements, reference numeral 4b is a shift register for shifting the color difference data so as to output in parallel the color difference (R−Y) data Dr (−1), Dr (0), Dr (+1) of three elements, reference numeral 4c is a shift register for shifting the color difference (B−Y) data so as to output in parallel the color difference (B−Y) data Db (−1), db (0), db (+1), reference numerals 5a, 5b are subtracting means for detecting a correlation value by the value difference between the adjacent brilliance data among the continuous three picture elements of the brilliance line memory 1, reference numeral 6 is a threshold value setting means for setting a given threshold value K, reference numerals 7a, 7b are absolute value comparing means for comparing the input absolute value with the threshold value K, reference numeral 8a is a computing means for computing the arithmetical mean of the color difference (B−Y) data of three picture elements, reference numerals 8b, 8c are computing means for computing the arithmetical mean of the color difference (R−Y) data of the adjacent two picture elements among the picture difference (R−Y) data of three picture elements, reference numeral 9a is a computing means for computing the arithmetical means of the color difference (B−Y) of three picture elements, reference numerals 9b, 9c are computing means for computing the arithmetical mean of the picture difference (B−Y) of the adjacent two picture elements among the color difference (B−Y) data of three picture elements, reference numerals 10a, 10b are selecting means for selecting one from a plurality of inputs in accordance with the outputs of the absolute value comparing means 7a, 7b, reference numeral 11 is an address switching means for switching the addresses between the first color difference (R−Y) line memory 2a and the second color difference (R−Y) line memory 2b, reference numeral 12a is a data switching means for switching the data between the first color difference (R−Y) line memory 2a and the above described second color difference (R−Y) line memory 2b, reference numeral 12b is a data switching means for switching the data between the first color difference (B−Y) line memory 2c and the second color difference (B−Y) line memory 2d, reference numeral 13 is an address delaying means for delaying by one picture element the address for setting the address setting means 3.

Assume that the number of the picture elements in the vertical direction of the image is N (positive integer). The image signal processing apparatus of the present embodiment constructed as described hereinabove will be described hereinafter in its operation.

An address setting means 3 is set to access from a first picture element in the top portion in the vertical direction of the image. Subsequently, the address to be set is increased one by one so that the final set address becomes a Nth picture element. The above described correlative detecting operation and the computing operation, the selecting operation by the selecting means start at a time when the address setting means 3 has set the address of the third picture element. Therefore, as the address delaying means 13 delays by one picture element the address for setting of the address setting means 3, the address for setting the address setting means 3 becomes the address of the noticeable picture element which is a center of extracted three picture elements.

Table 1 shows the operations of the address switching means 11 and the data switching means 12a, 12b by the switch setting signal B.

TABLE 1

| Switch Signal B | Address switch means 11 | Data switch means 12a | Data switch means 12b |
|---|---|---|---|
| 0 | Aa-Ac | Da-De | Dc-Dg |
|   | Ab-Ad | Db-Df | Dd-Dh |
| 1 | Aa-Ad | Da-Df | Dc-Dh |
|   | Ab-Ac | Db-De | Dd-Dg |

When the switch setting signal B is a "0", the address setting means 3 sets the address of the first color difference (R−Y) line memory 2a and the address of the first color difference (B−Y) line memory 2c. The address delaying means 13 sets the address of the second color difference (R−Y) line memory 2b and the address of the second color difference (B−Y) line memory 2d. The data of the first color difference (R−Y) line memory 2a and the data of the first color difference (B−Y) line memory 2c are outputted to the shift registers 4b, 4c by the data switching means 12a, 12b. The selection outputs Dr' (0), Db' (0) of the selecting means 10a, 10b are accommodated in the noticeable picture element of the second color difference (R−Y) line memory 2b and the noticeable picture element of the second color difference (B−Y) line memory 2d.

Similarly, when the switch setting signal Bb is a "1", the address setting means 3 sets the address of the second color difference (R−Y) line memory 2b and the address of the second color difference (B−Y) line memory 2d. The address delaying means 13 sets the address of the first color difference (R−Y) line memory 2a and the address of the first color difference (B−Y) line memory 2c. The data of the second color difference (R−Y) line memory 2b and the second color difference (B−Y) line memory 2d are outputted to the shift registers 4b, 4c by the data switching means 12a, 12b. The selection outputs Dr' (0), Db' (0) of the selecting means 10a, 10b are accommodated in the noticeable picture elements of the first color difference (R−Y) line memory 2a and the first color difference (B−Y) line memory 2c.

Continuously, the operation of the correlative detection operation restricted when the switch setting signal B is a "0" will be described.

The brilliance data and the color difference data of the N picture element in the vertical direction of the image are respectively stored in the brilliance line memory 1, the first color difference (R−Y) line memory 2a, the first color difference (B−Y) line memory 2c. The subtracting means 5a computes the difference between the Y (−1) and the Y (0) among the brilliance data Y (−1), Y (0), Y (+1) of three continuous picture elements in the vertical direction of the image. The subtracting means 5b computes the difference between the Y (0) and the Y (+1) among the brilliance data Y (−1), Y (0), Y (+1). The absolute value comparing means 7a, 7b compare the threshold value K established by the threshold value setting means 6 with the absolute value of the outputs of the subtracting means 5a, 5b so as to output the binary coded signal of 1 bit of A1, A0 showing the size relation of "1" if the threshold value K is smaller, "0" if the threshold value K is more than.

The restriction is effected when the switching setting signal B is the "0" so as to describe the computing operation of the color difference data. The subtracting means 8a computes the arithmetical mean of the color difference (R−Y) data Dr (−1), Dr (0), Dr (+1) of the color difference (R−Y) line memory 2a corresponding to the brilliance data Y (−1), Y (0), Y (+1) of continuous three picture elements in the above described vertical direction. The computing means 8b computes the arithmetical mean of the color difference (R−Y) data Dr (−1), Dr (0) of two picture elements corresponding the brilliance data Y (−1), Y (0). The computing means 8c computes the arithmetical mean of the color difference (R−Y) data Dr (0), Dr (+1) of two picture elements corresponding to the brilliance data Y (0), Y (+). Like the computing means 8a, 8b, 8c, the computing means 9a computes the arithmetical mean of the color difference (B−Y) data Db (−1), Db (0), Db (+1) of the color difference (B−Y) line memory 2a corresponding to the brilliance data Y (−1), Y (0), Y (+1) of the continuous three picture elements in the above described vertical direction. The computing means 9b computes the arithmetical mean of the color difference (B−Y) data Db (−1), Db (0) of two picture elements corresponding to the brilliance data Y (−1), Y (0). The computing means 9c computes the arithmetical mean of the color difference (B−Y) data Db (0), Db (+1) of two picture elements corresponding to the brilliance data Y (0), Y (+1).

The operation of the correlative detection, the computing operation of the color difference data have been described with the restriction when the switch setting signal B is "0". The first color difference (R−Y) line memory 2a is switched to the second color difference (B−Y) line memory 2b if the switch setting signal B is "1". Simply by the switching operation between the first color difference (B−Y) line memory 2c and the second color difference (B−Y) line memory 2d, the operation is similar when the switch setting signal B is "0".

The operations of the selecting means 10a, 10b when the switch setting signal B is the "0" will be described hereinafter.

Table 2 shows the operation of the selecting means 10a. The truth table shows where the output should be effected by the inputting of the binary coded data of the outputs of the absolute value comparing means 7a, 7b, the selecting of either of the computing means 8a, the computing means 8b, the computing means 8c and the color difference (R−Y) data Dr (0). As shown in the Table 2, (A1, A0)=(0, 0) mean correlation among the brilliance data Y (−1), Y (0), Y (+1) of three picture elements. Namely, it shows the smooth brilliance distribution. It is judged that the change in color is also in small region, the arithmetical average value data Ra of the color difference (R−Y) data Dr (−1), Dr (0), Dr (+1) of three picture elements are selected, outputted.

The (A1, A0)=(1, 1) signifies no correlation among the brilliance data of three picture elements. Accordingly, the color difference (R−Y) data Dr (0) of the noticeable picture elements is selected, outputted from the meaning of the noise prevention.

The (A1, A0) =(0, 1) means the correlation between the brilliance data Y (0) of the noticeable picture element and the brilliance data Y (+1) of the picture element of the adjacent lower portion of the noticeable picture element. Namely, the filtering in the vertical direction is prohibited among the noticeable picture element and the picture elements of the adjacent upper portion of the noticeable picture element in a region where a large change in the brilliance level exists between the noticeable picture element and the picture element of the adjacent upper portion of the noticeable picture element, so that the arithmetical mean value data Rc of the color data Dr (0), Dr (+1) of two picture elements are selected, outputted.

Similarly, the (A1, A0)=(1, 0) means correlation property between the brilliance data Y (0) of the noticeable picture element and the brilliance data Y (−1) of the picture element in the adjacent upper portion of the noticeable picture element. Namely, the filtering in the vertical direction is prohibited among the noticeable picture element and the picture elements of the adjacent lower portion of the noticeable picture element in a region where a large change in the brilliance level exists between the noticeable picture element and the picture element of the adjacent lower portion of the noticeable picture element, so that the arithmetic mean value data Rb of the color difference data Dr (−1), Dr (0) of two picture elements are selected, outputted.

TABLE 2

| A1 | A0 | Dr' (0) |
| --- | --- | --- |
| 0 | 0 | Ra |
| 0 | 1 | Rc |
| 1 | 0 | Rb |
| 1 | 1 | Dr (0) |

Table 3 shows the portion of the selecting means 10b. The truth table shows where the output should be effected by the inputting of the binary coded data of the outputs of the absolute value comparing means 7a, 7b, the selecting of either of the computing means 9a, the computing means 9b, the computing means 9c and the color difference (B−Y) data Db (0). The operation is similar to the selecting means 10a.

TABLE 3

| A1 | A0 | Db' (0) |
|----|----|---------|
| 0  | 0  | Ba      |
| 0  | 1  | Bc      |
| 1  | 0  | Bb      |
| 1  | 1  | Db (0)  |

Namely, the outputs Dr' (0), Db' (0) of the selecting means 10a, 10b obtained as a result of the detection of the correlation property among the upper, lower adjacent brilliance data Y (−1), Y (0), Y (+1) including the noticeable picture elements are accommodated in the second color difference (R−Y) line memory and the second color difference (B−Y) line memory as the new color difference data respectively through the data switching means 12a, 12b.

The address setting means 3 increases the address one by one, the noticeable picture element and the continuous three picture elements with the noticeable picture element as a center are shifted by one picture element to the lower portion so as to repeat, similarly, the above described series of selecting processing operation with respect to the whole picture element in the vertical direction of the image.

When the address setting means 3 completes the setting the address of the Nth picture element, the switch setting signal B is made "1". The second color difference (R−Y) line memory 2b with the new color data being accommodated in it is connected in the address switching means 11, the data switching means 12a, 12b so that the data may be outputted to the computing means 8a, 8b, 8c and the selecting means 10a through the shift register 4b. The second color difference (B−Y) line memory 2d is connected so that the data may be outputted to the computing means 9a, 9b, 9c and the selecting means 10b through the shift register 4c. The above described processing is similarly repeated with the switch setting signal B being switched, by the use of the new color difference data.

FIG. 2, FIG. 3, FIG. 4, FIG. 5 are diagrams showing the operation when the processing operation has been effected upon all the picture elements in the vertical direction and therefore, the similar processing is repeated another time.

Concretely FIG. 2 shows a diagram of operations where no correlation is provided to the brilliance data Y (−1), Y (0), Y (+1) of three picture elements which become the (A1, A0)=(0, 0) shown in the Table 2, FIG. 3 shows a diagram of operations where correlation is provided to the brilliance data of three picture elements which become the (A1, A0)=(1, 1), FIG. 4 shows a diagram of operations where correlation is provided to the brilliance data Y (0) of the noticeable picture elements which become the (A1, A0)=(0, 1) and the brilliance data Y (+1) of the picture element of the adjacent lower portion of the noticeable picture element, FIG. 5 shows a diagram of operations where correlation exists in the brilliance data Y (0) of the noticeable picture elements which become the (A1, A0)=(1, 0), and the brilliance data Y (−1) of the adjacent upper portion of the noticeable picture element.

Here reference character ΔY is an absolute value of the difference between the brilliance levels Ya and Yb. The contents of the first color difference (R−Y) line memory 2a and the second color difference (R−Y) line memory 2b are provided in the case of the same data. The first color difference (R−Y) line memory 2a is described. The color difference data c is inputted to the noticeable picture element Cr (0). The color difference data a, b, d, e are inputted to the picture elements Cr (−2), Cr (−1), Cr (+1), Cr (+2) of each upper, lower two picture elements.

The first color difference (R−Y) line memory 2a and the second color difference (R−Y) line memory 2b at the first time, the second time, the third time are alternately provided, because the first color difference (R−Y) line memory 2a and the second color difference (R−Y) line memory 2b are alternately switched by the switch setting signal B as described hereinabove.

If the processing is repeated twice in the smooth brilliance distribution as shown in FIG. 2, the color difference data of the noticeable picture element becomes (a+2b+3c+2d+e)/9, terms of a, b are increased as compared with the first (b+c+d)/3, and the range of the filtering is expanded.

The operation of the filtering operation shown in FIG. 2 in the color noises exists with the smooth brilliance distribution being shown in FIG. 6. As shown in FIG. 6, the range of the filtering shown in FIG. 2 is spread at the first time, the second time. It is understood how the color noise components are smoothened.

FIG. 3 has the sudden brilliance distribution in the picture element. If the processing is repeated, the color difference data of the noticeable picture element remains unchanged as c is.

Both the portions with the boundary being grasped so that the distribution of the color has also the boundary are processed independently in accordance with the boundary portion of the brilliance when the boundary portion or the like of the brilliance is distributed as shown in FIG. 4, FIG. 5. The relation is retained if the processing is repeated.

Figure 7:
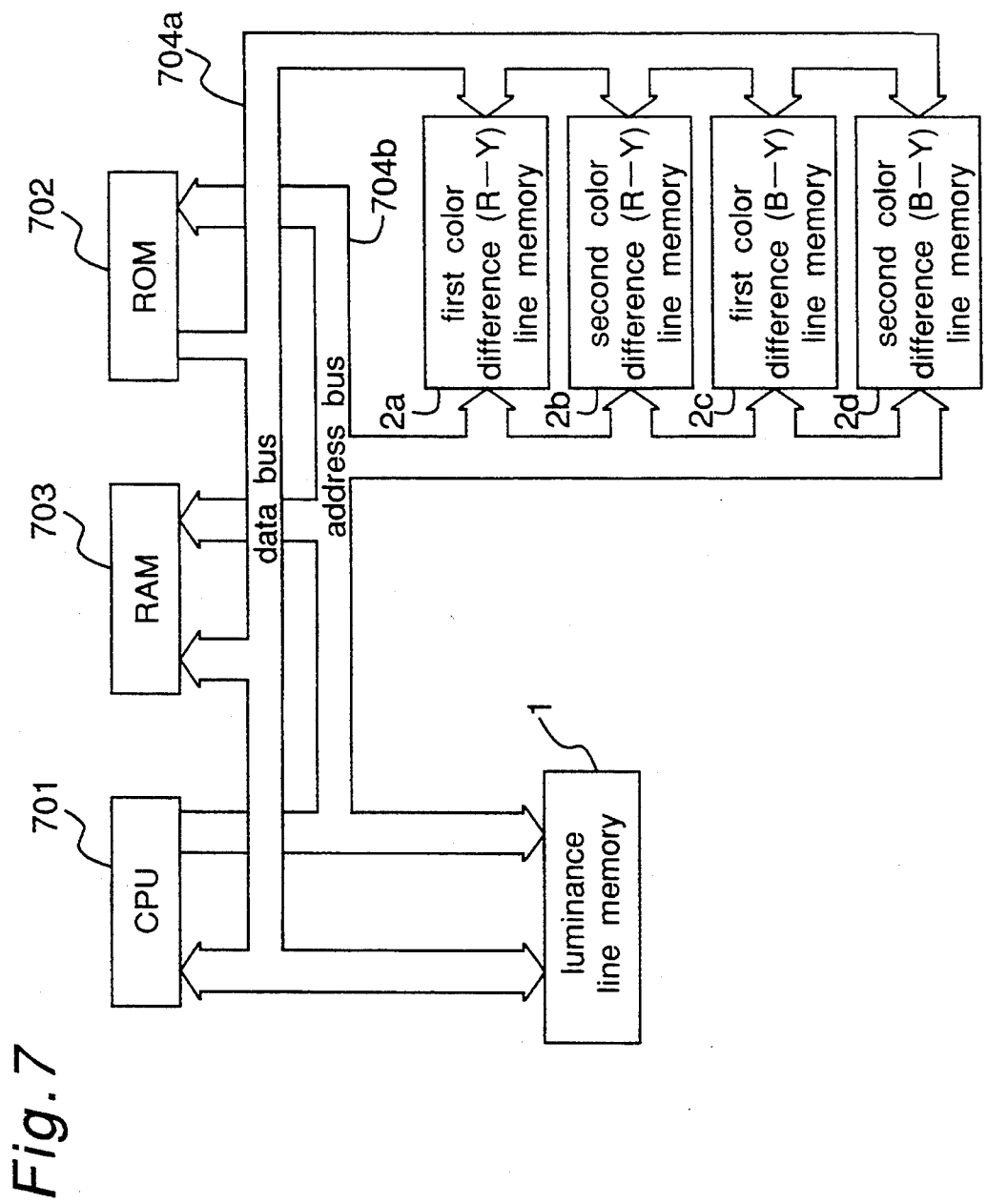
FIG. 7 is an electric block diagram showing one example of providing the video signal process by means of software.

FIG. 7 is an electric block diagram showing one example of carrying out the video signal process by means of software. In FIG. 7, the reference numeral 701 is a CPU, 702 a ROM for storing a program, given values and the likes, 703 a RAM used as a stock, variable parameter, work area, 704a an address bus, and 704b a data bus. In addition, there provide positioned as shown in FIG. 7 the luminance line memory 1, first color difference (R−Y) line memory 2a and second color difference (R−Y) line memory 2b, first color difference (B−Y) line memory 2c and second color difference (B−Y) line memory 2d of FIG. 1.

Figure 8:
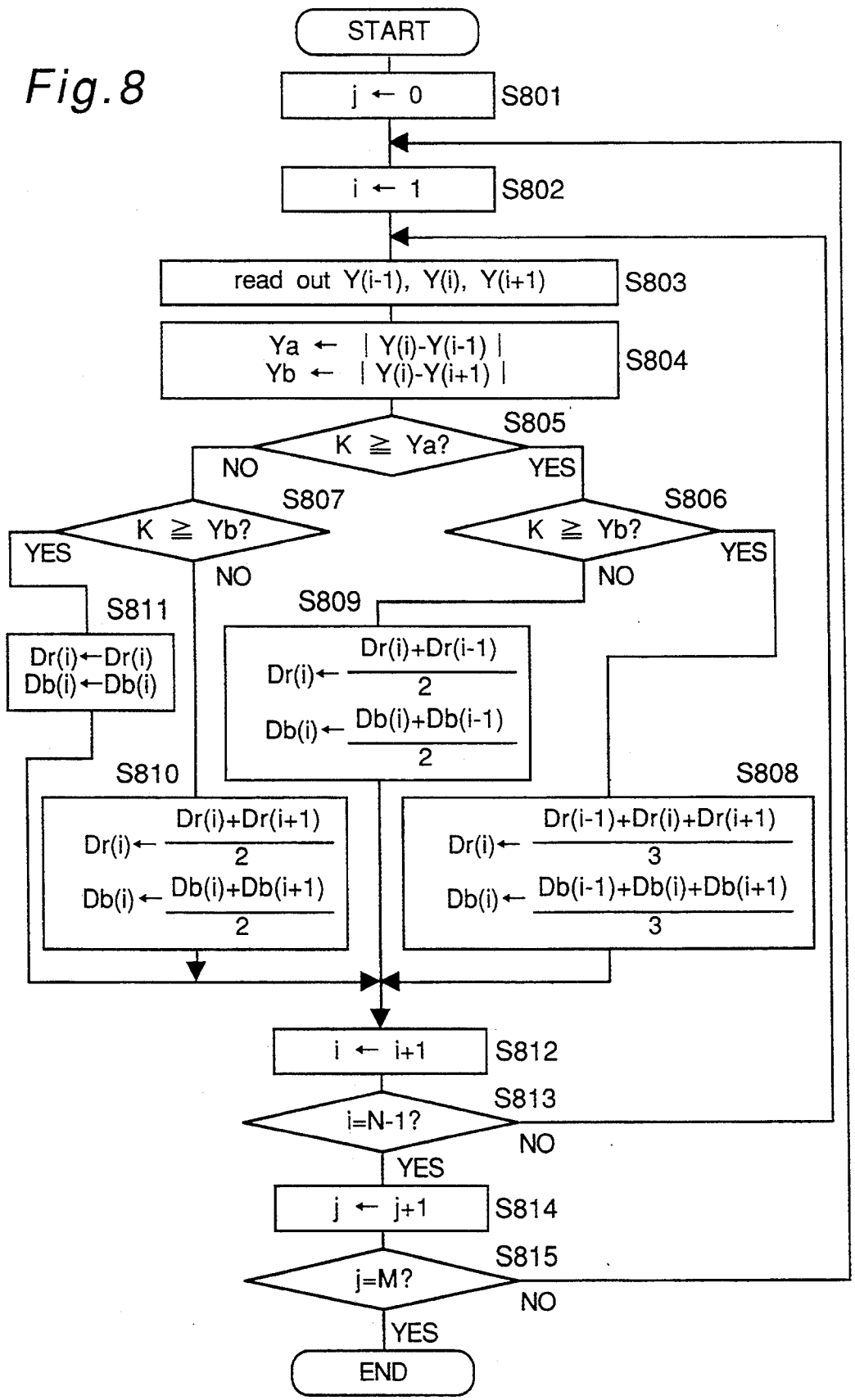
FIG. 8 is a flow chart showing the process of the one example of FIG. 7.
Figure 9:
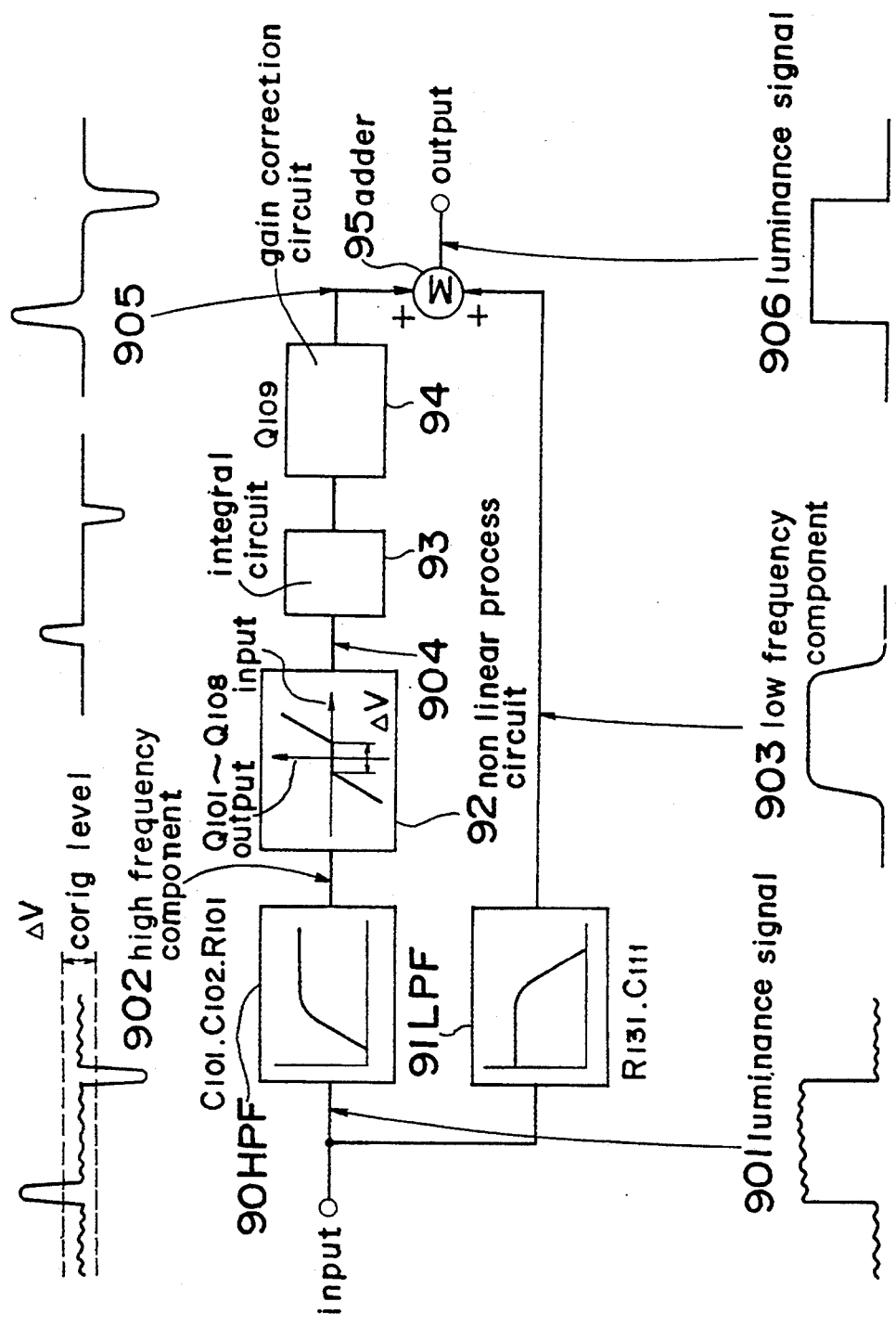
FIG. 9 is a diagram showing a principal for eliminating the video noise in a first conventional video apparatus.
Figure 10:
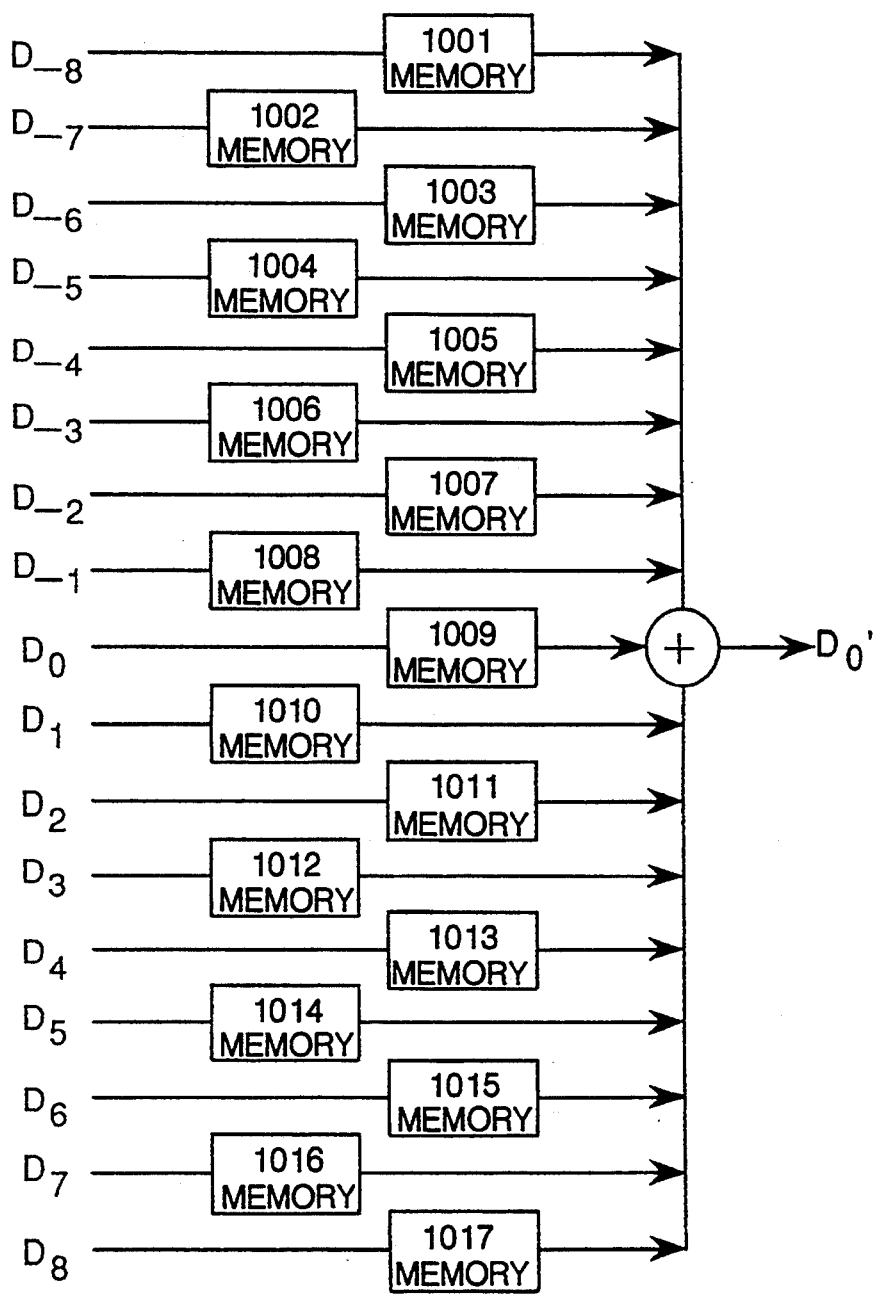
FIG. 10 is a diagram showing a digital data processing means for eliminating the color noise in a second conventional video apparatus.

Also, FIG. 8 is a flow chart showing the process of one example shown in FIG. 7. In FIG. 8, it is carried out at the step S801 an initializing of j for counting the repetition numbers of process for one line, and at the step S802 an initializing of i for counting a noticed picture element. At the step S803, the luminance data Y(−i), Y(i), Y(+i) of three picture elements continued in the vertical direction are read out from the luminance line memory, and the noticed picture element is set by the address shown with i. At the step S804, the operation is done for the luminance difference data Ya of absolute value being a difference of between the luminance data Y(i) and Y(i+1), and the luminance difference data Yb of absolute value being a difference of between the luminance data Y(i) and Y(i+1). At the steps of S805 to S807, it is decided to distribute among the processes of steps S808 to S811 in the comparison between the threshold value K and luminance difference data Ya and between the threshold value K and luminance difference data Yb. At this time, the existence of correlation is decided in such a manner that upon making the comparison between the given threshold value K and luminance difference data Ya, Yb it is considered to exist the correlation in the case of the threshold value K being larger than the luminance difference data Ya, Yb, but not to exist the correlation in the case of the threshold value K being smaller than the luminance difference data Ya, Yb.

Namely, when the correlation is set up respectively among three picture elements of luminance data Y(i−1), Y(i), Y(i+1), the process is moved to the step S808. And, at the step S808, an arithmetic mean among the color difference (B−Y) data of Dr(i−1), Dr(i), Dr(i+1) corresponding to three picture elements of luminance data Y(i−1), Y(i), Y(i+1) aligned in succession in the vertical direction as well as an arithmetic mean among the color difference (B−Y) data of Db(i−1), Db(i), Db(i+1) are calculated to reset up the resultants at the positions of Dr(i), Db(i).

In the case of that there is some correlation between the luminance data Y(i) of noticed picture element and the luminance data Y(i−1) of upper picture element adjacent to the noticed picture element, the process is moved to the step S809. At the step S809, an arithmetic mean between the two picture elements of color difference (R−Y) data of Dr(i), Dr(i−1) and an arithmetic mean between the color difference (B−Y) data of Db(i), Db(i−1) are calculated to reset up the resultants at the positions of Dr(i), db(i).

In the case of that there is some correlation between the luminance data Y(i) of noticed picture element and the luminance data Y(i−1) of lower picture element adjacent to the noticed picture element, the process is moved to the step S810. At the step S810, an arithmetic mean between two picture elements of color difference (R−Y) data of Dr(i), Dr(i−1) and an arithmetic mean between the color difference (B−Y) data of Db(i), Db(i+1) are calculated to reset up the resultants at the positions of Dr(i), Db(i).

When there is nothing of correlation among the three color pictures of luminance data Y(i−1), Y(i), Y(i+1), the process is moved to the step of S811. At the step S811, without making any operation, the resetting up is made at the positions of Dr(i), Db(i). Here, the resetting processes at the steps of S808 to S811 are set at address as shown in FIG. 7 in such a manner that, in the case of calculating the data of first color difference (R−Y) line memory 2a, the calculated resultant is stored into the second color difference (R−Y) line memory 2b, and, in the case of calculating the data of second color difference (R−Y) line memory 2b, the calculated resultant is stored into the first color difference (R−Y) line memory 2a. These first color (R−Y) line memory 2a and second color (R−Y) line memory 2b are rewritten to change at every times of finishing the process for the size of one line in the vertical direction.

At the step of S812, there provides a process for shifting one by one the position of noticed picture element, and, if the process for the size of one line does not completed, the process is moved to the step of S803. Further, when the process of the one line size is completed, at the steps of S814, S815 the repeating processes for the process of one line size are done to set up the number of processes for the one line size by the value of M.

As mentioned above, the central picture element among the three element pictures consisting of luminance data and color element data aligned in succession in the vertical direction is designated as a noticed picture element at the step of S803. At the steps S805, S805, S807, the respective correlation among the three picture elements are examined in such a manner that, in the case of the correlation being set up between the noticed picture element and the luminance data of picture element adjacent to the upper side of noticed picture element, an arithmetic mean value between the noticed picture element and the luminance data of picture element adjacent to the upper side of noticed picture element is changed at the step S809 to the color element data of noticed picture element, in the case of the correlation being set up between the noticed picture element and the luminance data of picture element adjacent to the lower side of noticed picture element, an arithmetic mean value of color data between the noticed color element and the picture element adjacent to the lower side of noticed picture element is changed at the step S810 to the color element data of noticed picture element, in the case of the correlation being set up among all the luminance data of three picture elements, an arithmetic mean value of color element data of the three picture elements is changed at the step S808 to the color element data of noticed picture element, and, in the case of the luminance data among the three picture elements being none of correlation, the color element data of noticed picture element is not changed any more at the step of S811.

Further, if the values of M are plural at the step of S815, it is repeated at plural times to change the color element data of noticed picture element.

In the collected operations in the above described present embodiment, the arithmetical mean computation is effected in the vertical direction of the color difference data of the image data. The arithmetical mean computing processing becomes one type of filtering processing where the color noise components in the horizontal direction of the image are diffused in the vertical direction of the image. This becomes a smoothing filter for diffusing in the vertical direction the color noise components in the horizontal direction by the filtering processing of the color difference data in the vertical direction.

The correlation of the brilliance of three picture elements including the noticeable picture elements is detected from the brilliance data of the upper, lower adjacent picture elements of the noticeable picture elements so as to change the strength of the above described filtering processing and the range thereof in accordance with the results for effecting the processing operation corresponding to the change in the brilliance.

In the present embodiment, the embodiment by the hard construction is described. For example, with the use of the construction of the personal computer or the like without the restriction to the embodiment, the operation processing can be effected with the software processing.

As is clear from the forgoing description, according to the arrangement of the present invention, a human being has visual characteristics that the resolution with respect to the color is lower than the resolution of the brilliance, so that the frequency zone of the color signal is set narrower than the frequency zone of the brilliance signal. As the vertical direction of the color difference data of the image has the frequency zone depending upon the number of the scanning lines at the same level as the brilliance data, the color noise becomes segmental in the horizontal direction. The improvement of S/N can be effected without deterioration in the resolution simply by the restriction of the frequency zone in the vertical direction unnecessary to the color signal.

The color noise components in the horizontal direction is diffused in the vertical direction, in a region where the change in the brilliance distribution is less, by the detection of the correlation in the vertical direction of the brilliance. The smoothing processing with respect to the color signal is prohibited with respect to the abrupt edge portion (for example, contours) so as to preserve the edge portion of the color, with an superior effect that the S/N improvement of the high level can be effected without deterioration of the color resolution in the vertical direction of the image.

The reference picture elements in the vertical direction are made three, and the smoothing processing with respect to the color signal in the above described vertical direction is repeated with a plurality of times with a superior effect that the effect of reducing the color noises equal to the smoothing processing for referring many picture elements from three picture elements can be obtained by the lowest circuit construction.

Although the present invention has been fully described by way of example with reference to the accompanying drawings, it is to be noted here the various changes and modifications will be apparent to those skilled in the art. Therefore, unless otherwise such changes and the modifications depart from the scope of the present invention, they should be construed as included therein.

What is claimed is:

1. An image signal processing method for reducing color noise in a video image signal for a video apparatus without degrading resolution comprising the steps of:
   selecting three continuous picture elements in the vertical direction of a video image signal, each picture element including brilliance data and color data, the three picture elements including a lower, a central and an upper picture element;
   calculating, using a predetermined threshold value, brilliance data correlations for the three picture elements such that a brilliance data correlation exists when a brilliance data difference between two picture elements is smaller than the predetermined threshold;
   calculating mean values of the color data for the three picture elements;
   reducing, using the brilliance data correlations and the means values the color noise of the video image signal without degrading resolution, wherein the step of reducing includes the steps of
      selecting, when a brilliance data correlation exists between the upper and central picture elements and not for the lower and central picture elements, a mean value of the color data between the upper picture element and the central picture element as the color data for the central picture element;
      selecting, when a brilliance data correlation exists between the lower and central picture elements and not for the Upper and central picture elements, a mean value of the color data between the lower picture element and the central picture element as the color data for the central picture element;
      selecting, when a brilliance data correlation exists between the three picture elements, a mean value of the color data for all three picture elements as the color data for the central picture element; and
      selecting, when no brilliance data correlation exists between 1) the upper and central picture elements and 2) the lower and central picture elements, the central picture element color data as the color data for the central picture element.

2. An image signal processing method for reducing color in a video image signal for a video apparatus without degrading resolution comprising the steps of:
   a) selecting three picture elements continuous in the vertical direction of a video image signal, each picture element including brilliance data and color data, the three picture elements including a lower, a central and an upper picture element;
   b) calculating, using a predetermined threshold value, brilliance data correlations for the three picture elements such that a brilliance data correlation exists when a brilliance data difference between two picture elements is smaller than the predetermined threshold;
   c) calculating mean values of the color data for the three picture elements;
   d) reducing, using the brilliance data correlations and the means values, the color noise of the video image signal without degrading resolution, wherein the step of reducing includes the steps of
      d1) selecting, when a brilliance data correlation exists between the upper and central picture elements and not for the lower and central picture elements, a mean value of the color data between the upper picture element and the central picture element as the color data for the central picture element;
      d2) selecting, when a brilliance data correlation exists between the lower and central picture elements and not for the upper and central picture elements, a mean value of the color data between the lower picture element and the central picture element as the color data for the central picture element;
      d3) selecting, when a brilliance data correlation exists between the three picture elements, a mean value of the color data for all three picture elements as the color data for the central picture element;
      d4) selecting, when no brilliance data correlation exists between 1) the upper and central picture elements and 2) the lower and central picture elements, the central picture element color data as the color data for the central picture element; and
   e) repeating steps a) through d4) for the entire image.

3. An image signal processing apparatus for reducing color noise in a video image signal without degrading resolution comprising:
   a brilliance line memory for storing the brilliance data of a picture element,
   a first color data line memory and a second color data line memory for storing the color data of a picture element, an extracting means for extracting the brilliance data and the color data of three continuous picture elements in the vertical direction including an upper, a lower, and a central picture element, a plurality of computing means for computing the mean of the color data for 1) all three picture elements, 2) the upper and central picture elements and 3) the lower and central picture elements, a plurality of correlation value detecting means for obtaining and outputting correlation values for the brilliance data of the three picture elements such that a brilliance data correlation exists when a brilliance data difference between two picture elements is smaller than a predetermined threshold, a setting means for outputting a reference set value related to the correlation of the three picture elements, a plurality of comparing means for comparing the output of the plurality of correlation value detecting means with the output of the setting means and producing an output, a selecting means, responsive to the output of the plurality of comparing means, for selectively passing the output of one of the plurality of computing means as output color data for the central picture element to produce an image with reduced color noise.

4. An image signal processing apparatus defined in claim 3, wherein the computing means includes a first computing means for computing and outputting the mean of the color data of the three picture elements, a second computing means for computing and outputting the mean of the color data of the central picture element and an upper picture element, a third computing means for computing and outputting the mean of the color data of the central picture element and a lower picture element, wherein the selecting means selectively passes (1) the output of the first computing means when a correlation exists for the three picture elements, (2) the output of the second computing means when a correlation exists between the upper and central picture elements and not for the lower and central picture elements, (3) the output of the third computing means when a correlation exists between the lower and central picture elements and not for the upper and central picture elements and (4) the color data of the central picture element when no correlation exists between all three picture elements.

5. An image signal processing apparatus defined in claim 3 or 4, wherein the extracting means includes an address setting means for setting addresses for the brilliance line memory, a parallel outputting means for outputting the continuous three picture elements in parallel, an address switching means for switching the address of the first color data line memory and the address of the second color data line memory, a data switching means for switching the data of the first color data line memory and the data of the second color data line memory.

* * * * *

UNITED STATES PATENT AND TRADEMARK OFFICE
CERTIFICATE OF CORRECTION

PATENT NO. : 5,432,869
DATED : July 11, 1995
INVENTOR(S) : Matsumoto et al.

It is certified that error appears in the above-indentified patent and that said Letters Patent is hereby corrected as shown below:

Column 13, line 68, claim 1, "Upper" should be
--upper--.

Column 14, line 16, claim 2, after "color" insert
--noise--.

Signed and Sealed this

Twenty-third Day of January, 1996

Attest:

BRUCE LEHMAN

Attesting Officer     Commissioner of Patents and Trademarks